May 31, 1960
J. W. HOLMAN
2,938,271
CLOTH MEASURING DEVICE
Filed March 10, 1955
2 Sheets-Sheet 1
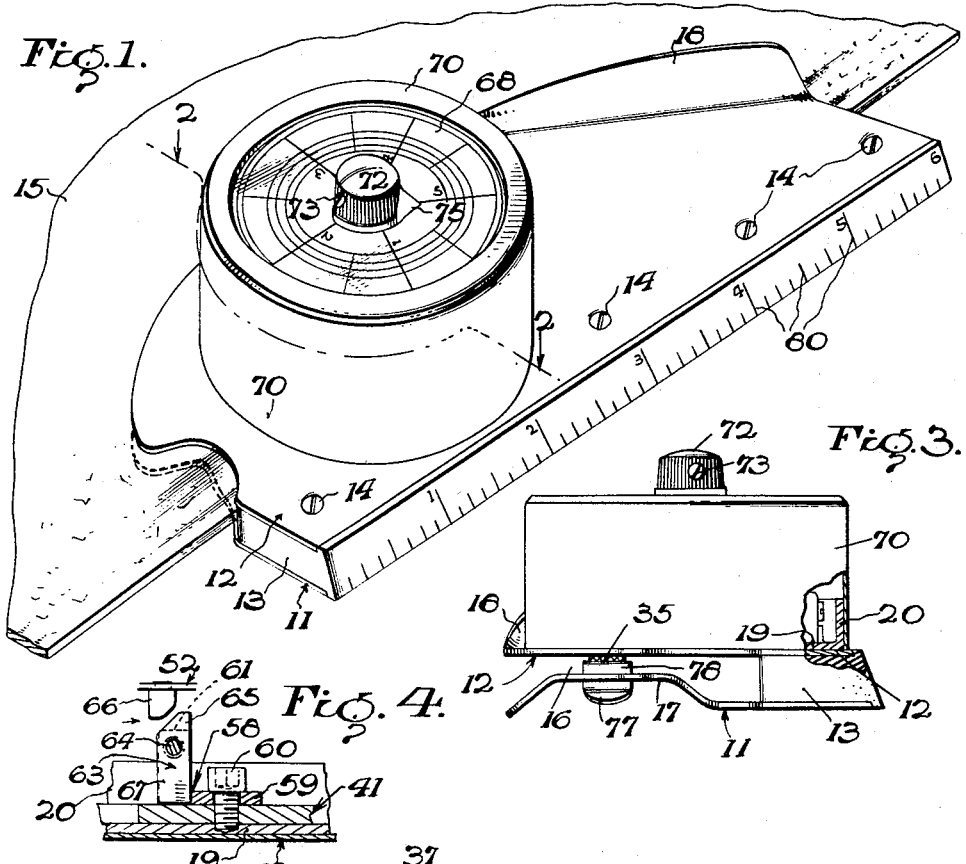
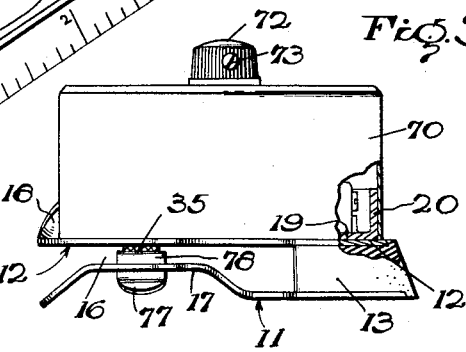
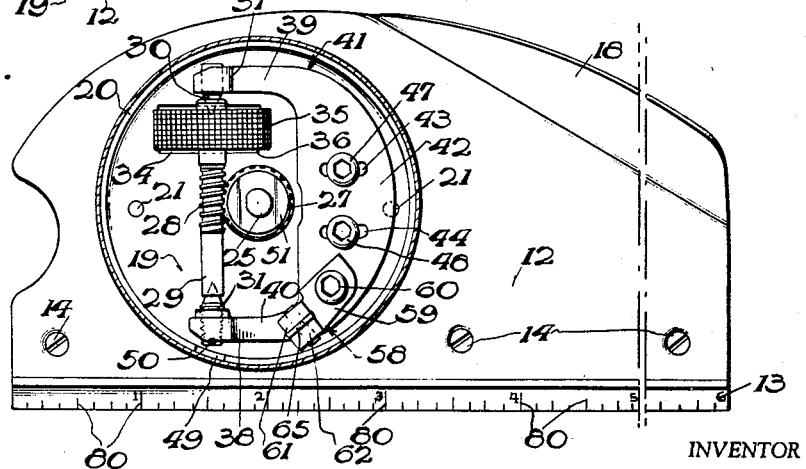
INVENTOR
John W. Holman.
BY
ATTORNEY May 31, 1960  J. W. HOLMAN  2,938,271
CLOTH MEASURING DEVICE
Filed March 10, 1955  2 Sheets-Sheet 2

INVENTOR
John W. Holman.
BY
ATTORNEY

United States Patent Office

2,938,271
Patented May 31, 1960

2,938,271

CLOTH MEASURING DEVICE

John W. Holman, 323 E. 9th St., Wellington, Kans.

Filed Mar. 10, 1955, Ser. No. 493,384

5 Claims. (Cl. 33—134)

This invention relates to cloth measurement and the general object thereof is the provision of an improved mechanical instrument for measuring cloth.

Another object of the invention is the provision of a cloth measuring instrument which is accurate, rugged and easy to use.

A further object of the invention is the provision of a cloth measuring instrument which is composed of only a few parts and which can be quickly assembled.

Various other objects and many advantages of the invention will be apparent from the following description considered together with the accompanying drawing.

In the drawing:

Fig. 1 is a perspetive view of an embodiment of the invention together with a portion of a piece of cloth being measured.

Fig. 2 is a plan sectional view partly broken away taken from a horizontal plane designated by the curved line 2—2 of Fig. 1.

Fig. 3 is an end elevational view partly broken away.

Fig. 4 is a fragmentary sectional view of the stop member and related parts.

Figure 5:
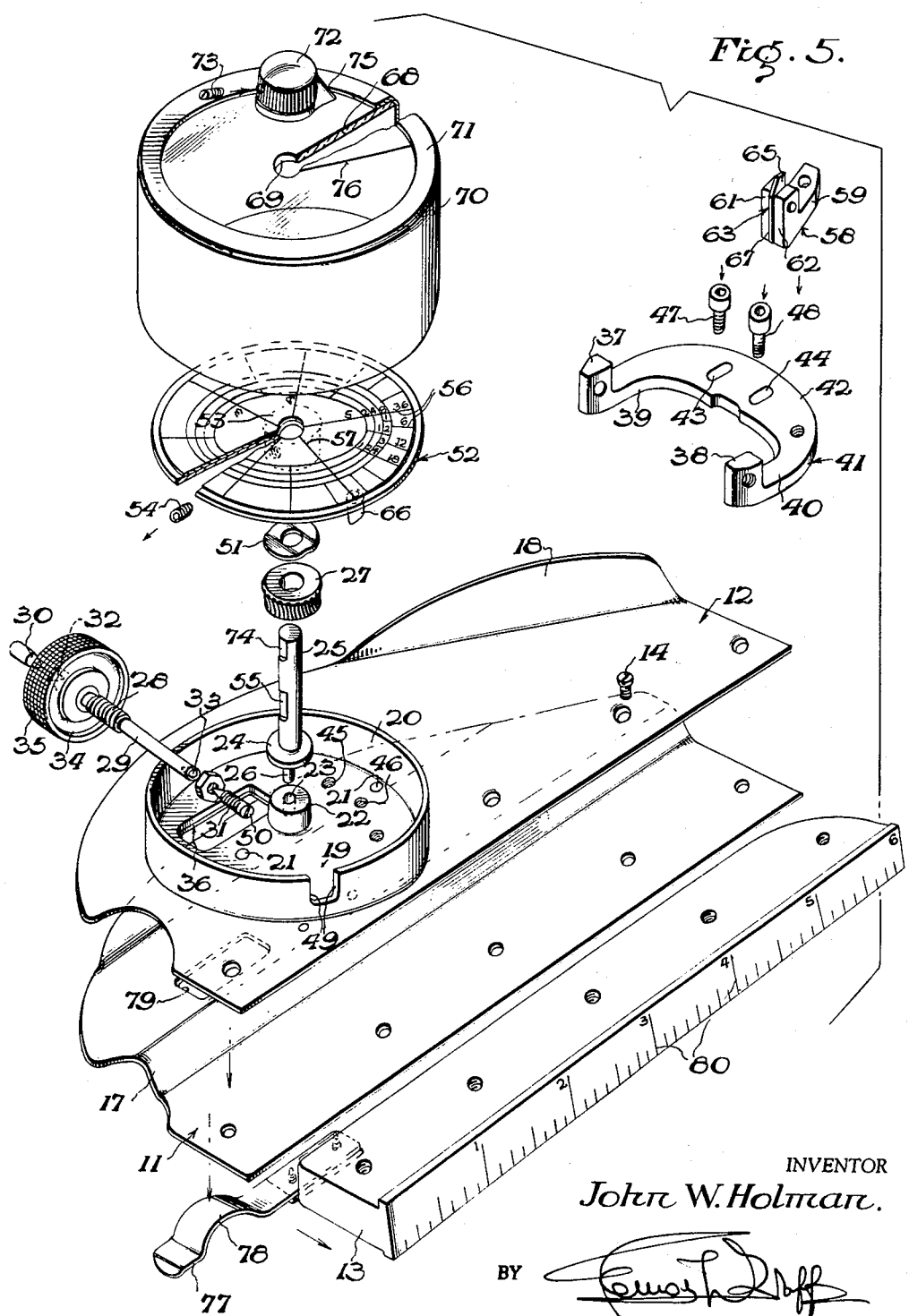
Fig. 5 is an exploded perspective view of the embodiment partly broken away.

Referring with more particularity to the drawings in which like numerals designate like parts, the embodiment illustrated comprises a pair of generally horizontal plates vertically spaced apart, namely a lower plate 11 and an upper plate 12. These plates are secured cantileverwise to a longitudinal bar 13 by screws 14, or by any other suitable means. The cloth 15 to be measured is passed between these two plates as will be explained more fully hereinafter and a restricted space 16 is provided between the plates by upwardly offsetting a medial portion 17 of the lower plate 11 as clearly shown in Fig. 3.

An edge portion 18 of the upper plate 12 is also turned diagonally upward to provide a throat for feeding the cloth to be measured between the two plates.

To the top of the upper plate 12, there is secured a cylindrical member having a flat bottom wall 19 and a circular upstanding flange 20. This member is fastened to the plate 12 by any suitable means such as the rivets 21 passing through the bottom wall 19.

The center of the wall 19 is integral with a circular boss or thrust bearing 22 and has a vertical aperture 23 therethrough.

The bearing 22 supports a collar 24 which is secured to the bottom of a shaft 25. The shaft 25 has a reduced section 26 which projects downwardly below the collar and fits in the aperture 23 with which it is rotatably engaged.

A worm wheel 27 is rotatably carried on the shaft 25. A worm gear 28 engages the worm wheel 27 and is integral with a horizontal shaft 29. The shaft 29 is rotatably mounted on conical pivot pins 30 and 31 which fit into corresponding conical recesses 32 and 33, respectively, at the ends of said shafts.

The shaft 29 also carriers for rotation therewith the measuring wheel 34 having a knurled periphery 35. Beneath the wheel 34, an aperture 36 is provided through both the bottom wall 19 and the inner plate 12, the wheel having a diameter sufficiently large to permit it to pass through the aperture 36 just beyond the bottom surface of the said upper plate.

The pins 30 and 31 are carried by upstanding posts 37 and 38, respectively, which form a part of the arms 39 and 40 of a U-shaped member or yoke 41. The connecting portion 42 of the yoke, between the arms 39 and 40, is on the side of the worm wheel 27 opposite the worm gear 28 and is provided with slotted apertures 43 and 44. Below said apertures 43 and 44 are threaded holes 45 and 46, respectively, for engaging screws 47 and 48. By means of this arrangement the yoke 41 can be adjusted to the proper position for engagement of the worm gear 28 and the worm wheel 27.

One of the pivot pins, say the pin 31, is threadedly engaged with its corresponding post 38 to permit adjustments and a portion 49 of the flange 20 is cut out to expose the outer end of the pivot pin which is provided with a screw driver slot 50 or other suitable means for engaging an adjustment tool.

When the worm gear 28 is properly engaged with the worm wheel 27 and the bolts 47 and 48 are secured in position to hold the yoke 41 in position, the worm wheel is prevented from moving axially of the shaft 25 due to the concavity of the worm wheel. This also prevents axial movement of the shaft 25 because the collar 24 is set between the worm wheel and the thrust bearing 22.

On top of the worm wheel there is placed an arched friction or slip ring 51 made of a stiff resilient material, such as brass. On top of the ring 51 there is mounted on the shaft 25 a dial wheel 52 having a bottom neck 53 in contact with the ring 51. The neck 53 is provided with a set screw 54 for clamping it to the shaft 25. The angular position of the wheel 52 relative to the shaft 25 is fixed by a flattened surface 55 on the shaft 25 which is for engaging the inner end of the set screw 54. The surface 55, however, is sufficiently long to permit axial adjustment of the wheel 52 on the shaft 25 so as to vary the degree of frictional engagement between the neck 53 and worm wheel 27 through the ring 51.

The top face of the dial wheel has gaduations 56 which indicate the number of yards and/or fractions of a yard of cloth measured or run through the device as a function of the number of revolutions of the measuring wheel 34. In the dial illustrated, the graduations go to five yards. The radial line 57 corresponding to the maximum yardage is also the index or zero line. It is obvious however, that these markings may be varied to suit any particular conditions and will, in any event, depend upon the ratio of gearing between the measuring wheel and the dial wheel.

In order to permit resetting the dial at the beginning of each measurement, there is provided an abutment device comprising an L-shaped member 58, the horizontal foot 59 of which is firmly secured to the yoke 41 by a bolt 60 or by any other suitable means. The vertical leg of the member 58 consists of two upstanding posts 61 and 62 laterally spaced apart to straddle a dog 63 which is pivotally carried by a pin 64 passing through said posts. The dog 63 has a portion 65 extending above the top of the posts to engage a stub pin or lug 66 attached to and projecting downwardly from the bottom of the dial wheel 52.

The dog 63 is gravity biased to the vertical position by virtue of the upper portion 65 thereof, above the pin 64, being shorter than the lower part 67 below the pin, the latter extending downwardly alongside of the foot part 59 and to contact it when the dial wheel is rotated clockwise as viewed in the several figures. When the dial wheel is rotated in the opposite direction, the pin or lug 66 will contact the other side of the dog 63 and cause it to pivot out of the path of the lug. After the lug has passed this point, the dog will return to its initial biased position. By these means provision is made for unrestricted rotation in the direction of measuring, and abutment in the opposite direction for resetting or returning the wheel to its initial position.

Over the face of the dial wheel 52, there is disposed a transparent glass or plastic crystal 68 having a center hole 69 for rotatably supporting it on the upper end of the shaft 25. The crystal 68 fits into the upper part of a cylindrical shell or casing 70 against an inwardly turned end flange 71 thereof and the bottom part of said shell frictionally engages the flange 20 whereby it may be rotatably adjusted thereon manually to change the angular position of the crystal 68 relative to the wheel 52.

The uppermost end of the shaft 25 projecting upwardly beyond the crystal 68 is provided with a knob 72 which is removably secured to the shaft by a screw 73 set against a flat surface 74 on the shaft. The knob 72 has a pointer 75 which in its set position overlies the starting line 57.

The crystal 68 is inscribed or otherwise provided with a radial line 76 which serves as an index reference mark for determining differential angular positions of the dial wheel.

The cloth 15, as it is being measured, is pressed against the bottom of the measuring wheel 34 by a cantilever spring clip 77 or other suitable means mounted on the lower plate 11 and having an arcuate portion 78 projecting through an aperture 79 directly beneath the said wheel.

The outer face of the bar 13 is provided with scale markings 80, such as inch markings and subdivisions thereof for measuring short lengths of cloth.

In operation, the cloth to be measured is passed between the upper and lower plates 11 and 12 and between the clip 77 and measuring wheel 34, after the dial has been set, as explained above, to the initial position. Should some slight movement of the measuring wheel take place during the placement of the cloth in this manner to move the dial wheel somewhat off of the starting position, it can readily be returned thereto by moving the cloth backwards a short distance. As the cloth is passed forwardly through the instrument, the dial wheel 52 rotates and the amount of cloth measured at any given time can be read on the scale thereon directly below the reference line 76.

I claim:

1. A cloth measuring instrument comprising a longitudinal bar, a pair of plate members secured cantileverwise to the bar and extending therefrom in parallel relation to each other, one of said plates having a portion thereof bent to provide in relation to the other plate a throat for feeding cloth to be measured between the two plates, a measuring wheel rotatably carried by one plate member and means carried by the other plate member adjacent said wheel for holding cloth to be measured against the rim of the wheel, a rotatably mounted dial wheel having graduations thereon for indicating the amount of cloth measured at any given time, and gearing means connecting said measuring wheel and dial wheel for co-rotation, said gearing means including a slip clutch.

2. A cloth measuring instrument comprising a longitudinal bar, a pair of longitudinal plate members secured cantileverwise to the bar and extending therefrom in parallel relation to each other, one of said plates having a portion thereof bent to provide in relation to the other plate a throat for feeding cloth to be measured between the two plates, a measuring wheel rotatably carried by one of said plate members and means carried by the other plate member adjacent said wheel for holding cloth to be measured against the rim of the wheel, a dial wheel rotatably mounted on one of said plate members having graduations thereon for indicating the amount of cloth measured at any given time, gearing means connecting said measuring wheel and dial wheel for co-rotation, said gearing means including a slip clutch, a transparent crystal overlying said dial wheel, means for supporting said crystal independently of said dial wheel, and an index reference mark carried by said dial wheel.

3. A cloth measuring instrument comprising a longitudinal bar, a pair of plate members secured cantileverwise to the bar and extending therefrom in parallel relation to each other, one of said plates having a portion thereof bent to provide in relation to the other plate a throat for feeding cloth to be measured between the two plates, a measuring wheel rotatably carried by one plate member and means carried by the other plate member adjacent said wheel for holding cloth to be measured against the rim of the wheel, a rotatably mounted dial wheel having graduations thereon for indicating the amount of cloth measured at any given time, gearing means connecting said measuring wheel and dial wheel for co-rotation, said means including a slip clutch, and means for preventing rotation of said dial wheel in one direction past a given point, said means being ineffective to prevent rotation of the dial in the opposite direction.

4. A cloth measuring instrument as defined by claim 3 in which the last mentioned means comprises a pivoted dog, a lug carried by the dial wheel for contacting said dog, and abutment means for preventing pivotal movement of the dog in one direction from a given normal position.

5. A cloth measuring instrument comprising a longitudinal bar, a pair of parallel longitudinal plate members secured to said bar cantileverwise in spaced relation, one of said plates being presented as an upper horizontal plate and the other as a lower horizontal plate, one of said plates having a portion thereof bent to provide in relation to the other plate a throat for feeding cloth to be measured between the two plates, a measuring wheel rotatably carried by the upper plate, resiliently yieldable means carried by the lower plate in a position adjacent said wheel for holding cloth to be measured against the rim of the wheel, a worm gear mounted for rotation with said wheel, a worm wheel in meshed relation with said worm gear, a vertical shaft having a collar for rotatably supporting said worm wheel and for supporting said shaft in a vertical position on said upper plate, a dial wheel mounted on said vertical shaft for rotation therewith, a friction clutch between said dial wheel and worm wheel, a transparent crystal overlying said dial wheel, means for rotatably supporting said crystal independently of said dial wheel on said upper plate and for holding the crystal in different positions of rotation, an index reference mark carried by said crystal, a pivoted dog carried by said upper plate, a lug carried by the dial wheel for contacting said dog, and abutment means for preventing pivotal movement of the dog in one direction only from a normal position.

References Cited in the file of this patent

UNITED STATES PATENTS

| | | |
|---|---|---|
| 408,935 | Siebert | Aug. 13, 1889 |
| 694,983 | Nieman | Mar. 11, 1902 |
| 1,028,313 | Williams | June 4, 1912 |
| 1,388,454 | Ehrlich | Aug. 23, 1921 |
| 1,437,207 | Stocke | Nov. 28, 1922 |
| 1,530,067 | Young | Mar. 17, 1925 |
| 2,114,693 | Weiss | Apr. 19, 1938 |